Aug. 19, 1941.  L. BERTRAND  2,253,284
CLUTCH
Filed March 9, 1938
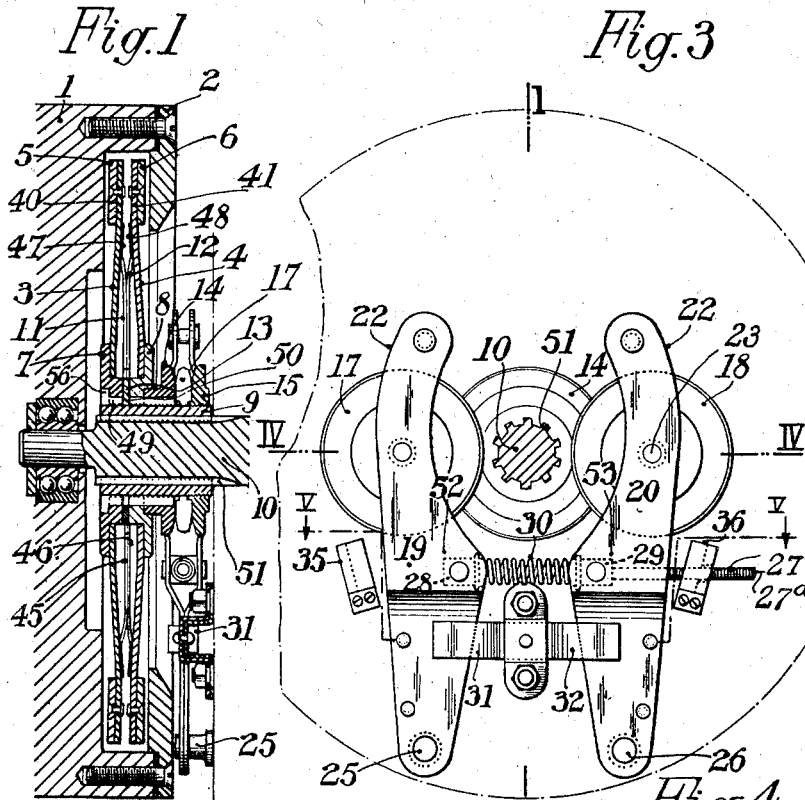
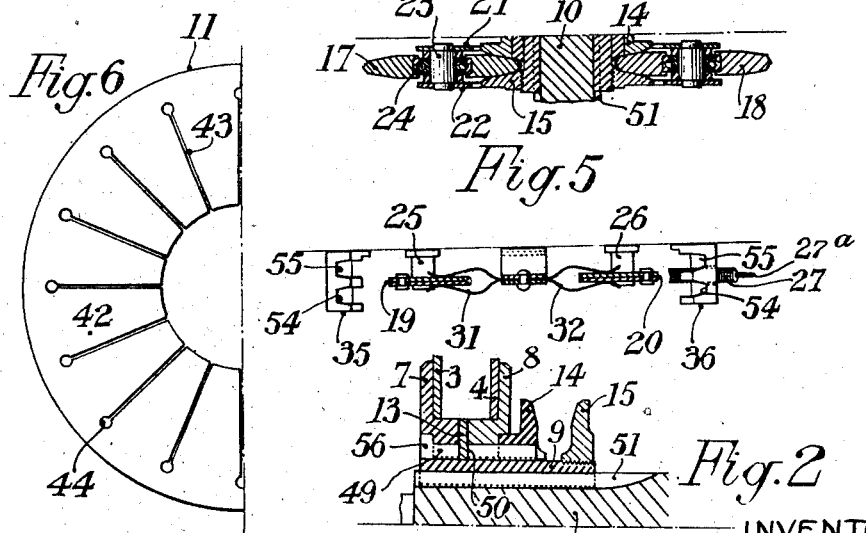
INVENTOR:
LUCIEN BERTRAND
BY Haseltine, Lake & Co.
ATTORNEYS Patented Aug. 19, 1941

2,253,284

UNITED STATES PATENT OFFICE 2,253,284

CLUTCH

Lucien Bertrand, Paris, France, assignor, by mesne assignments, to Borg Warner Corporation, a corporation of Illinois Application March 9, 1938, Serial No. 194,809 In France February 9, 1938

4 Claims. (Cl. 192—70)

The present invention relates to improvements in friction clutches and has for its principal object the provision of a friction clutch assembly that is relatively shallow axially, yet which is capable of transmitting torque loads at a speed comparable with friction clutches having greater axial dimension.

Another object is to provide a friction clutch of the character described wherein smooth clutching action is provided during the "slip" period although actual axial movement of the engaging parts is of relatively small amplitude.

A further object is to provide a friction clutch having engaging elements intended to be engaged and disengaged by relatively short movement, one with respect to the other, and wherein the clutch operating linkage is so constructed and arranged that the external control mechanism including the manually operable element may move through a path of relatively large amplitude.

Other objects, the advantages and uses of the invention will be apparent after reading the following specification and claims and after a consideration of the drawing forming a part of the specification wherein:

Fig. 1 is an axial section of the clutch according to line I—I of Fig. 3.

Fig. 2 is a partial section, on a larger scale, of part of Fig. 1.

Fig. 3 is an end view of the driving mechanism.

Fig. 4 is a section made according to line IV—IV of Fig. 3.

Fig. 5 is a section made according to line V—V of Fig. 3.

Fig. 6 is half a section of the star-like springs.

The driving member of the clutch is constituted by the fly-wheel 1 of the motor to which is conveniently secured the plate 2.

The driven member consists of two symmetrical disks 3, 4 which are coupled together and carrying each externally on their peripheries 40, 41, friction linings 5, 6; the one 5 bears against the fly wheel 1 and the other 6, against the plate 2. The webs of the said disc 3, 4 are pressed to include a small angle to the plane of the friction lining so as to resist the bending stresses imparted by the hub portion thereof a predetermined extent prior to the friction surfaces being separated under the action of the drive.

The two discs 3, 4 have internally splined hubs 7, 8 respectively by means of which they are engaged over an internally and externally splined sleeve 9. They are yieldingly urged apart for clutch engagement by springs 11, 12 of the Belleville washer type. The springs 11, 12 encircle the hub regions of the discs 3, 4 and the washer 13 and are thereby supported radially. They are supported axially by their peripheral contact with the discs 3, 4.

The said springs are for instance stamped from a plane disc 42 provided with a certain number of slots 43 stopped at some distance from the edge by holes 44, and are conveniently cambered. They bear against one another by their cambered parts 45, 46 so that their concavities will point outwardly and that their nonslotted parts 47, 48 will bear against the disks 3 and 4.

The hub 7 of the disc 3 engages at one end of its axial travel against radial projections 56 that are formed on the inward ends of the external splines 49 of the sleeve 9 and at the opposite end of travel by a washer 13 located in an annular slot 50 extending transversely through the splines 49. The sleeve 9 is splined as at 51 on the shaft 10.

On the sleeve 9 and against the hub 8 slides the pushing disk 14 driving along the said hub 8 of the disk 4 in its displacements. To the end of the sleeve 9 is screwed the pushing disk 15.

Between the said disks 14, 15 is located the clutch release mechanism; the latter is constituted by two rollers with biconical rim 17, 18 which form a rotary wedge.

Under the action of the said rollers, the pushing disks 14, 15 move apart the one from the other; the disk 15, connected to the sleeve 9, urges the latter to the right of the drawing, and thus causes the hub 7 and disk 3 to move therewith; the disk 14 pushes towards the left of the drawing the hub 8 of the disk 4. The two disks 3, 4 are thus brought nearer the one to the other against the resistance of the Belleville washer springs 11, 12 and the linings 5, 6 move apart from the driving plate 2 and the face of the flywheel 1.

The rollers 17, 18 are mounted on levers 19, 20 each comprising a pair of straps 21, 22 connected together by spindles 23, each roller being journalled upon a respective spindle 23 through the medium of a bearing 24 and embraced between its respective straps 21, 22. Each of the levers 19, 20 are pivoted, each at one end, on pins 25, 26 respectively mounted on a stationary part of the mechanism of which the clutch is a unit. The levers 19, 20 are urged apart by a spring 30 acting under compression against blocks 28, 29 pivoted between the intermediate regions 52, 53 of the levers 19, 20 respectively. The levers 19, 20 are adapted to be moved toward each other by a Bowden transmission including a sheath 27 bearing against the block 29 and a wire 27a which extends through the sheath 27 and through the spring 30 and is anchored in the block 28 so that a pull exerted against the other end of the wire, and a corresponding reactionary push exerted against the sheath 27, will urge the levers toward each other.

The levers 19, 20, in addition to pivoting, are adapted to slide axially on the pins 25, 26, said axial movement being limited by the springs 31 and 32 which yieldingly urge the levers toward normal positions centered with relation to the annular space between the discs 14, 15.

The outermost position of the two levers 19, 20 is limited by stationary stops 35, 36 provided, for example, with notches 54, 55 corresponding to the straps 21, 22 of each lever.

Accordingly, it will only be necessary to conveniently operate the cable 27 so as to act upon the jaws 19, 20, thereby causing the engagement of the rollers 17, 18 between the pushers 14, 15 and, consequently the disengagement of the discs 3, 4 from the plate 2, on the one hand, and from the fly-wheel 1, on the other hand.

I claim:

1. A friction clutch having relatively short axial dimension comprising a driving assembly including driving members having inwardly opposed friction engaging surfaces, said surfaces being substantially parallel to one another and axially separated a distance slightly greater than the normal peripheral thickness of a driven disk assembly to be interposed therebetween, a driven shaft having an axis of rotation common to the axis of rotation of said spaced driving members, and a clutch driven assembly mounted concentrically upon said shaft in driving engagement therewith and with its peripheral region located between said opposed friction engaging surfaces, said clutch driven assembly including friction facings mounted for movement relatively toward and away from one another with their remote faces adapted to engage the adjacent of said friction engaging surfaces on said driving members when the facings are moved relatively apart, and Belleville washer spring means of relatively shallow axial dimension, contained entirely within the confines of and supported by said driven assembly, acting normally to urge said friction facings relatively apart for clutch engagement.

2. In a friction clutch having relatively shallow axial dimensions, a driving assembly including driving members having inwardly opposed friction driving surfaces, a driven assembly including a driven shaft, a pair of spaced opposed facing mounting members drivingly mounted on said driven shaft for axially shifting movement, facing elements carried by the remote sides of said mounting members and adapted to make frictional engagement with said friction driving surfaces when spread apart, Belleville washer spring means of relatively shallow axial dimension, contained entirely within the confines of and supported by said driven assembly and acting against said mounting members for urging them apart for clutch engagement, and means coacting with the hub regions of said mounting members for moving them together for clutch disengagement.

3. In a friction clutch having relatively shallow axial dimension, a driving assembly having inwardly opposed axially spaced annular driving surfaces, a driven assembly including a shaft, a pair of axially spaced mounting members splined upon said shaft for axially separating movement, friction facings secured to the remote sides of the peripheral regions of said mounting members and adapted when moved apart to frictionally engage said driving surfaces for transmitting drive to said shaft, a pair of Belleville washer springs arranged back to back between said mounting members with their inner regions in engagement with each other and their peripheral regions engaging said mounting members and yieldingly urging the same apart for clutch engagement, and means coacting with the hub regions of said mounting members for moving them together for clutch disengagement.

4. A friction clutch as defined in claim 3, wherein said springs encircle hub regions of said mounting members and are thereby supported against radial displacement.

LUCIEN BERTRAND.